US012407192B1

(12) United States Patent
Li

(10) Patent No.: US 12,407,192 B1
(45) Date of Patent: Sep. 2, 2025

(54) ELECTRIC WIRELESS CHARGING DEVICE

(71) Applicant: Shenzhen Mgctech Co., Ltd., Shenzhen (CN)

(72) Inventor: Jiedan Li, Changde (CN)

(73) Assignee: SHENZHEN MGCTECH CO., LTD., Guangdong (CN)

( * ) Notice: Subject to any disclaimer, the term of this patent is extended or adjusted under 35 U.S.C. 154(b) by 0 days.

(21) Appl. No.: 19/027,575

(22) Filed: Jan. 17, 2025

(30) Foreign Application Priority Data

Jan. 7, 2025 (CN) .......................... 2025200300476

(51) Int. Cl.
*H02J 50/40* (2016.01)
*H02J 7/00* (2006.01)
*H02J 50/00* (2016.01)
*H02J 50/10* (2016.01)

(52) U.S. Cl.
CPC ............ *H02J 50/40* (2016.02); *H02J 7/0044* (2013.01); *H02J 50/005* (2020.01); *H02J 50/10* (2016.02)

(58) Field of Classification Search
CPC ................................ H02J 50/005; H02J 50/40
USPC ......................................................... 320/108
See application file for complete search history.

(56) References Cited

U.S. PATENT DOCUMENTS

| | | | |
|---|---|---|---|
| 2018/0011551 A1* | 1/2018 | Gothlin | .................. B60K 35/10 |
| 2021/0305825 A1* | 9/2021 | Zheng | ..................... H02J 50/10 |
| 2023/0327486 A1* | 10/2023 | Chen | ..................... H02J 7/0044 |
| | | | 320/108 |

FOREIGN PATENT DOCUMENTS

| | | | |
|---|---|---|---|
| CN | 108284754 A | | 7/2018 |
| CN | 209191705 U | | 8/2019 |
| CN | 209833531 U | * | 12/2019 |
| CN | 113085599 A | | 7/2021 |
| CN | 214205042 U | * | 9/2021 |

* cited by examiner

*Primary Examiner* — Drew A Dunn
*Assistant Examiner* — Ahmed H Omar
(74) *Attorney, Agent, or Firm* — Ming Jiang; OPENPTO US LLC

(57) ABSTRACT

Provided is an electric wireless charging device, including a charging dock, a rotating charging base, and a first driving component. The first driving component includes a driving body and a driving shaft; the driving shaft is connected with the charging dock, and the driving body is connected with the rotating charging base; and the driving body is rotatably connected with the driving shaft, and the rotation of the driving body relative to the driving shaft is suitable for driving the rotating charging base to rotate. In this way, the electric wireless charging device may charge different electronic devices respectively through the charging dock and the rotating charging base. Furthermore, the driving body may drive the rotating charging base to rotate, whereby the rotating charging base may rotate automatically to an appropriate position, which is convenient for a user to place the electronic device in an appropriate position for charging.

6 Claims, 8 Drawing Sheets

ELECTRIC WIRELESS CHARGING DEVICE

CROSS-REFERENCE TO RELATED APPLICATIONS

The application claims priority to Chinese patent application No. 2025200300476, filed on Jan. 7, 2025, the entire contents of which are incorporated herein by reference.

TECHNICAL FIELD

The present disclosure relates to the technical field of wireless charging devices, and in particular, to an electric wireless charging device.

BACKGROUND

A wireless charging device achieves wireless transmission of electric energy by using electromagnetic induction, magnetic resonance, or electric field coupling, and the like. The wireless charging devices are connected without wires or cables, and can transmit the electric energy to an electronic device from the wireless charging device by means of electromagnetic wave propagation so as to realize wireless charging, and improve the charging convenience of the electronic devices.

However, the wireless charging device in related technologies can charge only one electronic device, has a single function, and cannot meet use requirements of users.

SUMMARY

Embodiments of the present disclosure provide an electric wireless charging device, to solve the above technical problems.

The present disclosure is implemented through the following technical solutions:

Embodiments of the present disclosure provide an electric wireless charging device. The electric wireless charging device includes a charging dock, a rotating charging base, and a first driving component, where the first driving component includes a driving body and a driving shaft; the driving shaft is connected with the charging dock, and the driving body is connected with the rotating charging base; and the driving body is rotatably connected with the driving shaft, and the rotation of the driving body relative to the driving shaft is suitable for driving the rotating charging base to rotate.

In some embodiments, the charging dock includes a fixed mount, the fixed mount is provided with a fixed part, the driving shaft is installed on the fixed part, the rotating charging base includes a rotating support, the rotating support is provided with a connecting part, the driving body is installed on the connecting part, and the rotation of the driving body relative to the driving shaft is suitable for driving the rotating support to rotate.

In some embodiments, the fixed mount is further provided with a guiding part, the rotating support is provided with a guiding mating part, and the guiding mating part is slidably connected with the guiding part.

In some embodiments, the guiding mating part is provided with a wire through hole, and the wire through hole penetrates through the guiding part.

In some embodiments, the charging dock further includes a limit stop and guiding members, the limit stop is connected with the fixed mount, the limit stop is provided with a limit part, the guiding members penetrate through the limit part and are connected with the rotating support, an end, facing away from the rotating support, of each guiding member is limited in the limit part, the guiding members are suitable for limiting the movement of the rotating support along an axial direction of the guiding members, and the guiding members and the rotating support rotate synchronously around a rotating axis of the driving body.

In some embodiments, there are a plurality of guiding members, the plurality of guiding members are disposed around the periphery of the driving body, and the plurality of guiding members are distributed symmetrically relative to the rotating axis of the driving body.

In some embodiments, the electric wireless charging device includes a first charging part and a second charging part, the first charging part and the second charging part are both installed on the charging dock, and the first charging part and the second charging part are located on two opposite ends of the charging dock respectively.

In some embodiments, the electric wireless charging device includes a second driving component, the second driving component includes a driving main body and a driving gear, the first charging part is provided with a first toothed part, the second charging part is provided with a second toothed part, the first toothed part is engaged with one end of the driving gear, the second toothed part is engaged with the other end of the driving gear, the driving main body is suitable for driving the driving gear to rotate, the rotation of the driving gear is suitable for driving the first toothed part to move towards a first direction, the rotation of the driving gear is further suitable for driving the second toothed part to move towards a second direction, where the first direction and the second direction are different.

In some embodiments, the charging dock is provided with a first limit guiding part and a second limit guiding part, the first charging part is provided with a first guiding sliding part, the first guiding sliding part is slidably connected with the first limit guiding part, the second charging part is provided with a second guiding sliding part, and the second guiding sliding part is slidably connected with the second limit guiding part.

In some embodiments, the electric wireless charging device includes the first charging part and a watch magnetic member, the first charging part is provided with an accommodating cavity, and the watch magnetic member is installed in the accommodating cavity in a reversible manner.

According to the electric wireless charging device provided by the embodiments of the present disclosure, the first driving component of the electric wireless charging device includes the driving body and the driving shaft, the driving shaft is connected with the charging dock, the driving body is connected with the rotating charging base, the driving body is rotatably connected with the driving shaft, and the rotation of the driving body relative to the driving shaft is suitable for driving the rotating charging base to rotate. In this way, the electric wireless charging device may charge different electronic devices respectively through the charging dock and the rotating charging base, which is helpful to enhance functionalities of the electric wireless charging device. Furthermore, the driving body may drive the rotating charging base to rotate, whereby the rotating charging base may rotate automatically to an appropriate position, which is convenient for a user to place the electronic device in an appropriate position for charging, and eliminates the need for the user to manually toggle the rotating charging base, thereby enhancing user operation.

BRIEF DESCRIPTION OF DRAWINGS

In order to more clearly illustrate the technical solutions in embodiments of the present disclosure, drawings used in the description of the embodiments are simply described below. Apparently, the drawings in the following description are some embodiments of the present disclosure. For those skilled in the art, other drawings can be obtained without creative effort according to these drawings.

Figure 1:
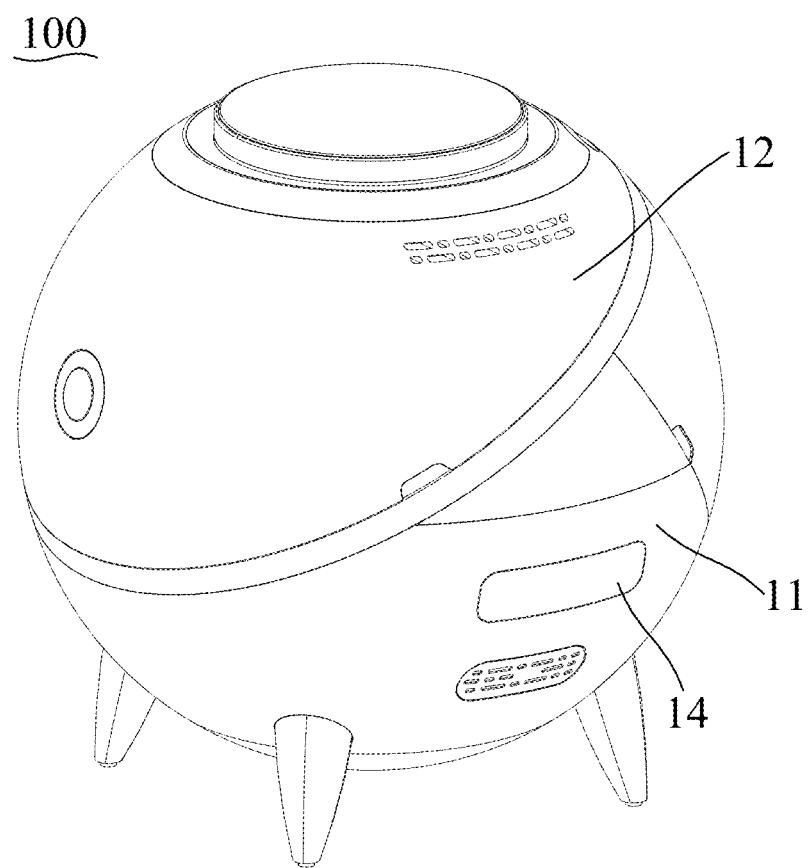
FIG. 1 is a schematic structural diagram of an electric wireless charging device according to an embodiment of the present disclosure.

Reference numerals in the accompanying drawings: electric wireless charging device 100; charging dock 11; fixed mount 111; fixed part 1111; guiding part 1112; limit stop 112; limit part 1121; guiding member 113; first limit guiding part 114; second limit guiding part 115; rotating charging base 12; rotating support 121; connecting part 1211; guiding mating part 1212; wire through hole 1213; mobile phone charging part 122; first driving component 13; driving body 131; driving shaft 132; first charging part 14; first toothed part 141; first guiding sliding part 142; accommodating cavity 143; second charging part 15; second toothed part 151; second guiding sliding part 152; second driving component 16; driving main body 161; driving gear 162; watch magnetic member 17.

DETAILED DESCRIPTION OF THE EMBODIMENTS

In order to make those skilled in the art better understand the solutions of embodiments of the present disclosure, the technical solutions in the embodiments of the present disclosure are further described clearly and completely below in combination with the accompanying drawings in the embodiments of the present disclosure. Apparently, the described embodiments are some embodiments of the present disclosure, but not all embodiments. All other embodiments obtained by the ordinary skilled in the art based on the embodiments of the present disclosure without creative efforts shall fall within the protection scope of the present disclosure.

Technical solutions in the embodiments of the present disclosure are described clearly and completely below in combination with accompanying drawings in the embodiments of the present disclosure.

Referring to FIG. 1, an embodiment of the present disclosure provides an electric wireless charging device 100. The electric wireless charging device 100 may be used to charge electronic devices such as mobile phones, watches, and earphones, thereby meeting charging requirements of different electronic devices.

Referring to FIG. 1 to FIG. 4 together, in some embodiments, the electric wireless charging device 100 includes a charging dock 11, a rotating charging base 12, and a first driving component 13; the first driving component 13 includes a driving body 131 and a driving shaft 132; the driving shaft 132 is connected with the charging dock 11; the driving body 131 is connected with the rotating charging base 12, and the driving body 131 is rotatably connected with the driving shaft 132; and the rotation of the driving body 131 relative to the driving shaft 132 is suitable for driving the rotating charging base 12 to rotate.

In this way, the electric wireless charging device 100 may charge different electronic devices respectively through the charging dock 11 and the rotating charging base 12, which is helpful to enhance functionalities of the electric wireless charging device 100. Furthermore, the driving body 131 may drive the rotating charging base 12 to rotate, whereby the rotating charging base 12 may automatically rotate to an appropriate position, which is convenient for a user to place the electronic device in an appropriate position for charging, and eliminates the need for the user to manually toggle the rotating charging base 12, thereby improving user operation.

Different electronic devices refer to different types of electronic devices. For example, the electric wireless charging device 100 may charge a mobile phone and a wireless rechargeable watch respectively through the charging dock 11 and the rotating charging base 12. For another example, the electric wireless charging device 100 may charge a mobile phone and an earphone respectively through the charging dock 11 and the rotating charging base 12. This may be set specifically according to an actual situation. Different electronic devices may also refer to the same type of electronic devices. For example, the electric wireless charging device 100 may charge different mobile phones respectively through the charging dock 11 and the rotating charging base 12. For another example, the electric wireless charging device 100 may charge different earphones respectively through the charging dock 11 and the rotating charging base 12. This may be set specifically according to an actual situation. The following description takes the electric wireless charging device 100 charging different types of electronic devices as an example.

Exemplarily, the rotating charging base 12 may support the charging of a mobile phone. A magnet component and a mobile phone charging coil may be arranged in the rotating charging base 12, and the user may place the mobile phone on the rotating charging base 12, such as on the mobile phone charging part 122, for charging; the charging dock 11 may support the charging of an earphone, an earphone charging coil may be arranged in the charging dock 11, and the user may place the earphone on the charging dock 11, such as on the second charging part 15, for charging; and the charging dock 11 may further support the charging of a wireless rechargeable watch, a magnet may be arranged in the charging dock 11, and the user may place the wireless rechargeable watch on the charging dock 11, such as on the first charging part 14, for charging.

Figure 3:
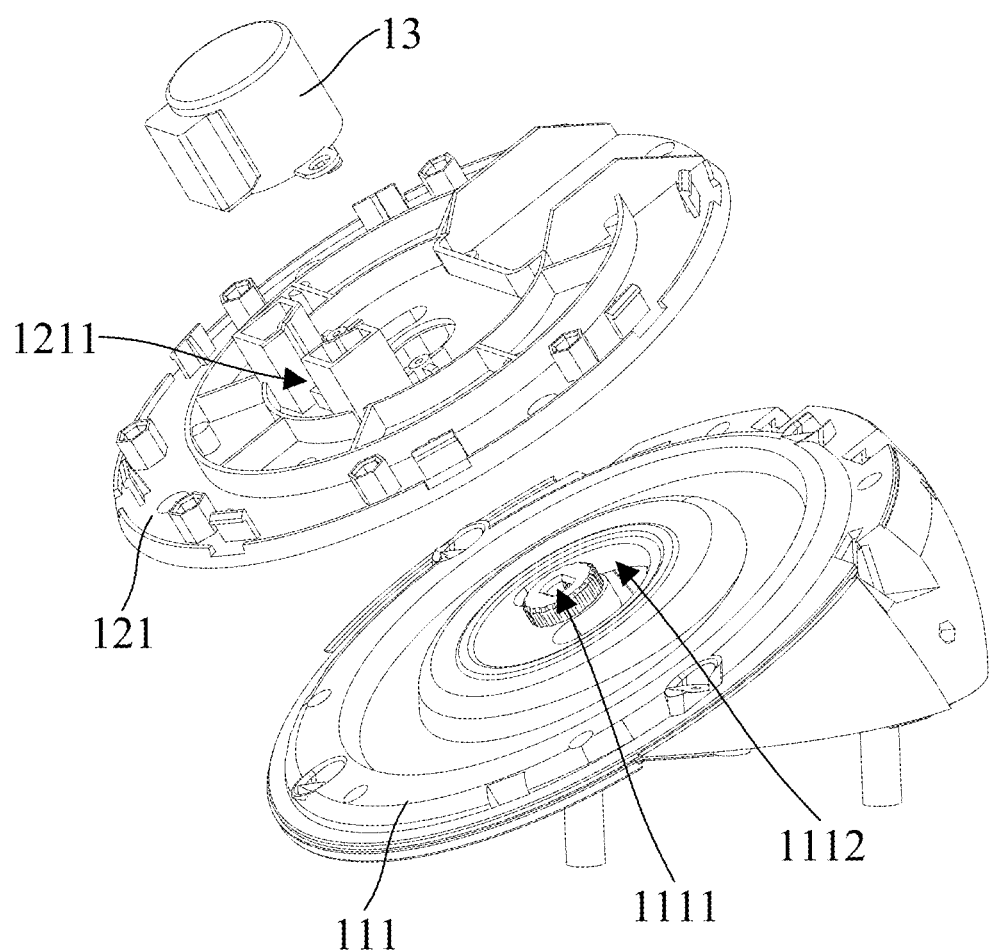
FIG. 3 is a schematic structural diagram of a first driving component, a fixed mount, and a rotating support of the electric wireless charging device of FIG. 1.
Figure 4:
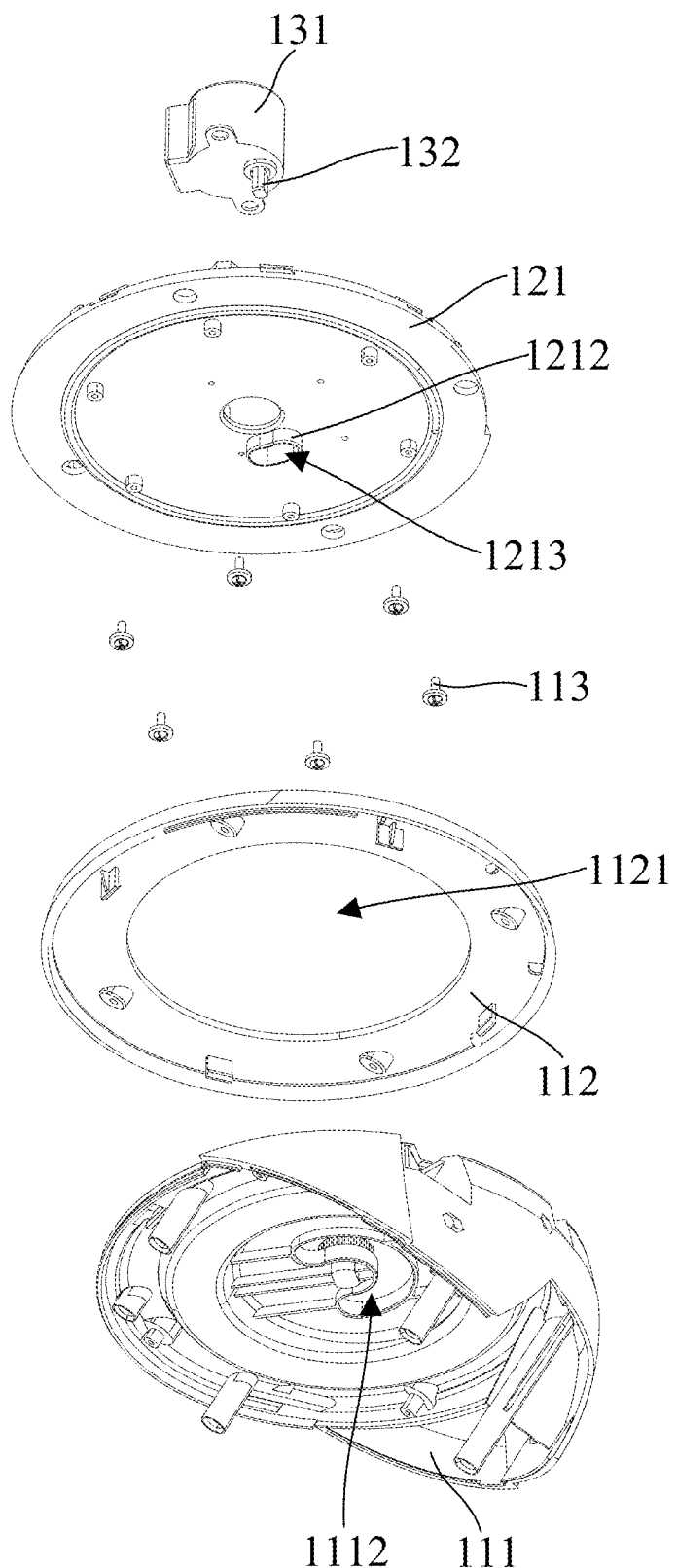
FIG. 4 is a schematic structural diagram of a first driving component, a fixed mount, a rotating support, a limit stop, and guiding members of the electric wireless charging device of FIG. 1.

Referring to FIG. 3 and FIG. 4, in some embodiments, the charging dock 11 includes a fixed mount 111, the fixed mount 111 is provided with a fixed part 1111, the driving shaft 132 is installed on the fixed part 1111, the rotating charging base 12 includes a rotating support 121, the rotating support 121 is provided with a connecting part 1211, the driving body 131 is installed on the connecting part 1211, and the rotation of the driving body 131 relative to the driving shaft 132 is suitable for driving the rotating support 121 to rotate.

In this way, the fixed part 1111 may locate a position where the driving shaft 132 is connected with the fixed mount 111, which is helpful to improve the accuracy of connection of the driving shaft 132 to the fixed mount 111, further to improve the firmness of the connection between the driving shaft 132 and the fixed part 1111, and further to reduce the situation that the driving shaft 132 is detached from the fixed part 1111. The connecting part 1211 may locate a position where the driving body 131 is connected with the rotating support 121, which is helpful to improve the accuracy of connection of the driving body 131 to the rotating support 121, further to improve the firmness of the connection between the driving body 131 and the connecting part 1211, and further to reduce the situation the driving body 131 is detached from the connecting part 1211.

Exemplarily, the fixed part 1111 may be a clamping hole, which allows the driving shaft 132 to be clamped in the clamping hole, thereby locating a connection position between the driving shaft 132 and the fixed mount 111, and further improving the firmness of the connection between the driving shaft 132 and the fixed part 1111; and the connecting part 1211 may be a slot, which allows the driving body 131 to be clamped in the slot, thereby locating a connection position between the driving body 131 and the rotating support 121, and further improving the firmness of the connection between the driving body 131 and the connecting part 1211.

In some embodiments, the fixed mount 111 is also provided with a guiding part 1112, the rotating support 121 is provided with a guiding mating part 1212, and the guiding mating part 1212 is slidably connected with the guiding part 1112.

In this way, the guiding part 1112 may limit a rotating path of the rotating support 121, the rotating support 121 may rotate along a set path through the sliding cooperation between the guiding mating part 1212 and the guiding part 1112, thereby reducing the situation that the rotating support 121 deviates from the set path.

The cooperation between the guiding part 1112 and the guiding mating part 1212 may be cooperation between a block and a groove. For example, the guiding part 1112 may be a guiding groove, the guiding groove may be located on a surface of the fixed mount 111 facing the rotating support 121, the guiding mating part 1212 may be guiding block, the guiding block may be located on a surface of the rotating support 121 facing the fixed mount 111, and the guiding block is slidably located in the guiding groove. In other embodiments, the cooperation between the guiding part 1112 and the guiding mating part 1212 may also be cooperation between blocks. This may be set specifically according to an actual situation.

A central angle of the guiding part 1112 may be limited by setting a shape of the guiding part 1112, thereby limiting a rotating angle of the rotating support 121. For example, the guiding part 1112 may be a semicircular guiding groove, whereby the central angle of the guiding part 1112 is 180°, causing the rotating support 121 to rotate for 180° relative to the guiding part 1112. For another example, the guiding part 1112 may be a quarter-circular guiding groove, whereby the central angle of the guiding part 1112 is 90°, causing the rotating support 121 to rotate for 90° relative to the guiding part 1112. This may be set specifically according to an actual situation.

In some embodiments, the guiding mating part 1212 is provided with a wire through hole 1213, and the wire through hole 1213 penetrates through the guiding part 1112.

In this way, a wire of the electric wireless charging device 100 may be accommodated in the wire through hole 1213, and electrically connected with a device in the charging dock 11 and a device in the rotating charging base 12 respectively to ensure the normal work of each device, thereby facilitating the reasonable layout of the wires, and reducing the situation that the wires get tangled due to the scattering of the wires in the charging dock 11 and the rotating charging base 12. Because the wire may directly penetrate through the wire through hole 1213 to be electrically connected with the device in the charging dock 11 and the device in the rotating charging base 12, the fixed mount 111 and the rotating support 121 may not hinder the assembly of the wires; and the wires can be electrically connected with the devices at two sides of the rotating support 121 without bypassing the peripheries of the fixed mount 111 and rotating support 121, thereby improving the structural compactness of the electric wireless charging device 100, and further facilitating the layout of the wires.

Figure 5:
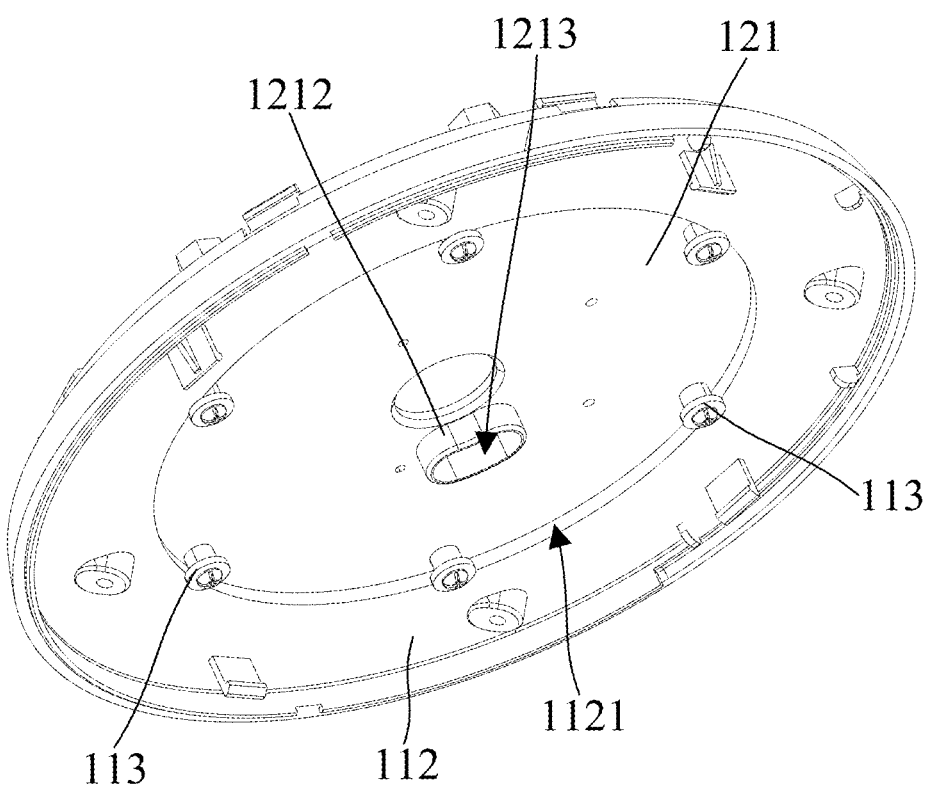
FIG. 5 is a schematic structural diagram of a rotating support, a limit stop, and guiding members of the electric wireless charging device of FIG. 1.

Referring to FIG. 3 to FIG. 5 together, in some embodiments, the charging dock 11 further includes a limit stop 112 and guiding members 113, the limit stop 112 is connected with the fixed mount 111, the limit stop 112 is provided with a limit part 1121, the guiding members 113 penetrate through the limit part 1121 and are connected with the rotating support 121, an end, facing away from the rotating support 121, of each guiding member 113 is limited in the limit part 1121, the guiding members 113 are suitable for limiting the movement of the rotating support 121 along an axial direction of the guiding members 113, and the guiding members 113 and the rotating support 121 rotate synchronously around a rotating axis of the driving body 131.

In this way, the guiding members 113 may limit the movement of the rotating support 121 along the axial direction of the guiding members 113, the guiding members 113 may also support the rotation of the rotating support 121 around the rotating axis of the driving body 131, to realize the rotatable connection between the rotating support 121 and the limit stop 112, thereby reducing the situation that the rotating support 121 moves along the axial direction of the guiding members 113 when rotating, and improving the rotating stability of the rotating support 121.

The guiding member 113 may be a screw and other structures, the limit part 1121 may be a through hole, a screw stem of the screw penetrates through the limit part 1121 and is connected with the rotating support 121, a head of the screw is limited in the limit part 1121, and the screw stem and head of the screw are located at two sides of the limit part 1121 respectively, whereby the screw may limit the movement of the rotating support 121 along the axial direction of the screw, and the head of the screw may also rotate around the end of the limit part 1121 along the rotating axis of the driving body 131.

In some embodiments, there are a plurality of guiding members 113, the plurality of guiding members 113 are disposed around the periphery of the driving body 131, and the plurality of guiding members 113 are distributed symmetrically relative to the rotating axis of the driving body 131.

In this way, it is helpful to improve the firmness of rotatable connection between the limit stop 112 and the rotating support 121, better to reduce the situation that the rotating support 121 moves along the axial direction of the guiding member 113, and also better to improve the rotating stability of the rotating support 121 around the rotating axis of the driving body 131.

For example, the quantity of the guiding members 113 may be two, three, four, five, six, seven, eight, or even more, and this may be set specifically according to an actual situation.

Referring to FIG. 1 and FIG. 2 again, in some embodiments, the electric wireless charging device 100 includes a first charging part 14 and a second charging part 15, and the first charging part 14 and the second charging part 15 are both installed on the charging dock 11.

In this way, the charging dock 11 may charge two electronic devices through the first charging part 14 and the second charging part 15, which is helpful to enhance functionalities of the charging dock 11, and further to enhance functionalities of the electric wireless charging device 100.

The first charging part 14 and the second charging part 15 may be of a same structure so as to charge the same type of electronic devices; and the first charging part 14 and the second charging part 15 may further be of different structures, so as to charge different types of electronic devices. This may be set specifically according to an actual situation. The following description takes the first charging part 14 and the second charging part 15 that are of different structures for charging different types of electronic devices as an example.

In some embodiments, the first charging part 14 and the second charging part 15 are located on two opposite ends of the charging dock 11 respectively.

In this way, it is helpful for the user to charge two electronic devices from two ends of the charging dock 11, thereby reducing the mutual interference of the first charging part 14 and the second charging part 15 when in work, and ensuring the normal work of the first charging part 14 and the second charging part 15.

Figure 2:
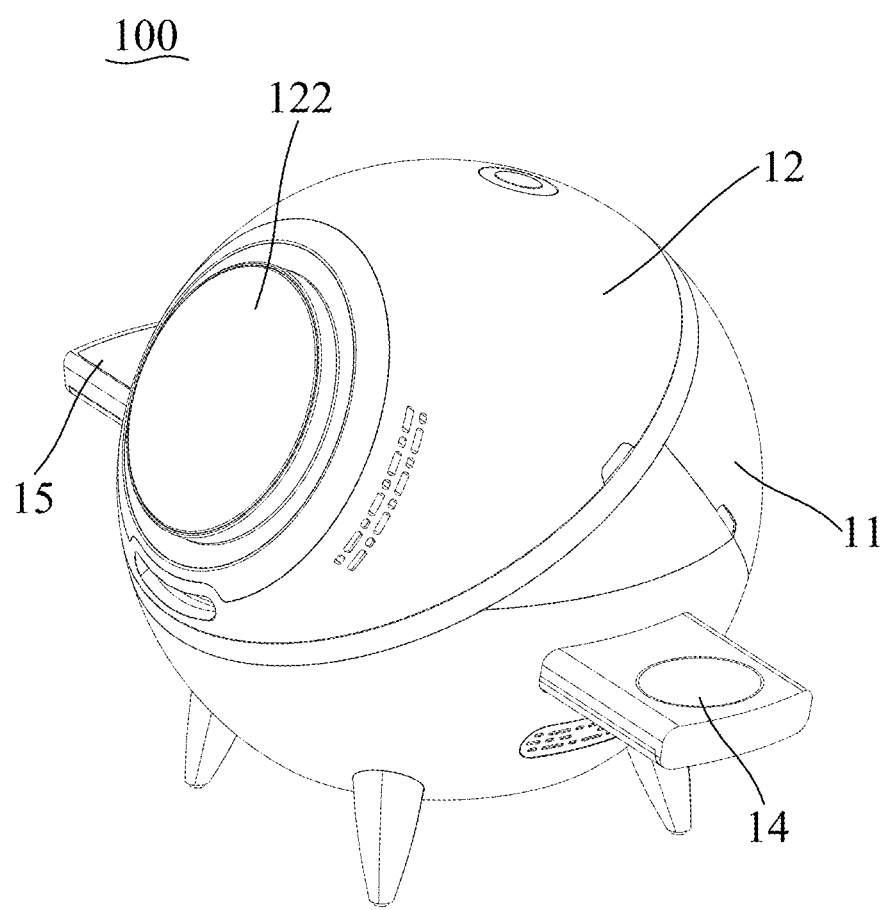
FIG. 2 is a schematic structural diagram of the electric wireless charging device of FIG. 1 in another state.
Figure 6:
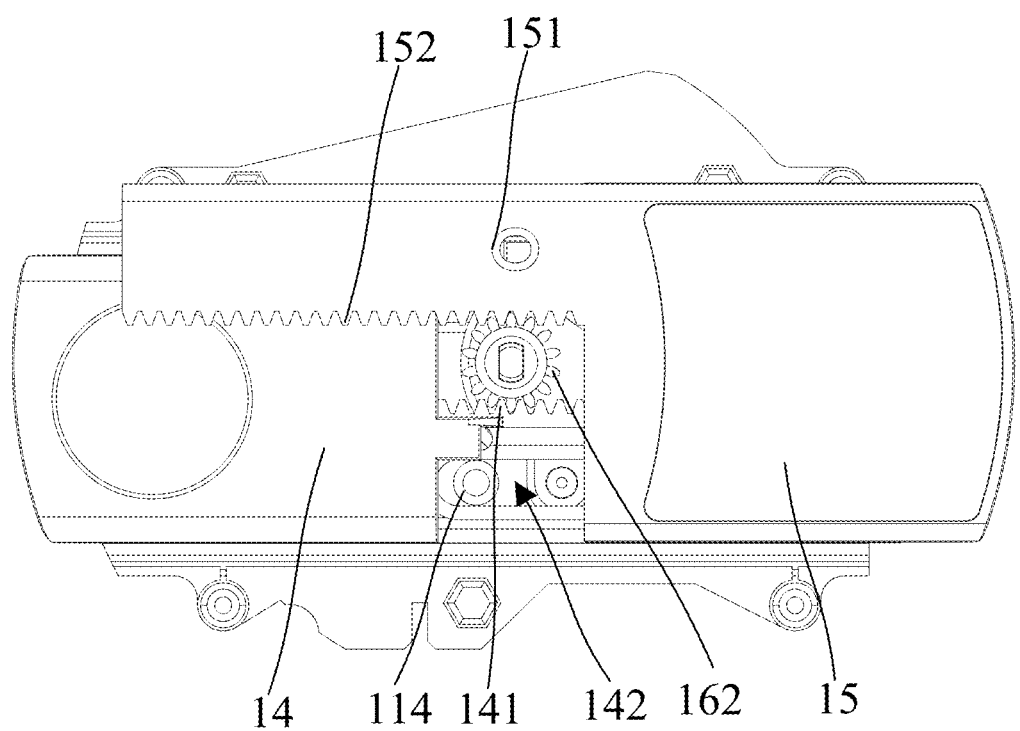
FIG. 6 is a schematic structural diagram of a second driving component, a first charging part, and a second charging part of the electric wireless charging device of FIG. 1.

Referring to FIG. 1, FIG. 2, FIG. 6, and FIG. 7 again, in some embodiments, the electric wireless charging device 100 includes a second driving component 16, the second driving component 16 includes a driving main body 161 and a driving gear 162, the first charging part 14 is provided with a first toothed part 141, the second charging part 15 is provided with a second toothed part 151, the first toothed part 141 is engaged with one end of the driving gear 162, the second toothed part 151 is engaged with the other end of the driving gear 162, the driving main body 161 is suitable for driving the driving gear 162 to rotate, the rotation of the driving gear 162 is suitable for driving the first toothed part 141 to move towards a first direction, the rotation of the driving gear 162 is further suitable for driving the second toothed part 151 to move towards a second direction, where the first direction and the second direction are different.

In this way, the driving main body 161 may drive the driving gear 162 to rotate, and the rotation of the driving gear 162 may drive the first toothed part 141 and the second toothed part 151 to move in different directions, whereby the first charging part 14 and the second charging part 15 may move automatically to an appropriate position, which is convenient for the user to place the electronic device in the appropriate position for charging; and the user may charge the electronic device without manually pushing and pulling the first charging part 14 and the second charging part 15, thereby facilitating the operation of the user.

Furthermore, the charging dock 11 is provided with the second driving component 16 to realize the automatic movement of the first charging part 14 and the second charging part 15, thereby simplifying the structure of the charging dock 11, and saving the manufacturing cost.

"Different" refers to that the first direction is different from the second direction, for example, the first direction is opposite to the second direction.

Exemplarily, when the driving main body 161 drives the driving gear 162 to rotate clockwise, the clockwise rotation of the driving gear 162 may drive the first toothed part 141 and the second toothed part 151 to extend out of the charging dock 11, as shown in FIG. 2, whereby the first charging part 14 and the second charging part 15 may move automatically to an appropriate position; and the first charging part 14 and the second charging part 15 may extend out of the charging dock 11 without the manual pulling by the user, thereby facilitating the user to place the electronic devices on the first charging part 14 and the second charging part 15 for charging. When the driving main body 161 drives the driving gear 162 to rotate counterclockwise, the counterclockwise rotation of the driving gear 162 may drive the first toothed part 141 and the second toothed part 151 respectively to extend into the charging dock 11, whereby the first charging part 14 and the second charging part 15 may move automatically into the charging dock 11, as shown in FIG. 1, thereby facilitating the restoration and accommodation of the first charging part 14 and the second charging part 15; and the first charging part 14 and the second charging part 15 may extend into the charging dock 11 without the manual pushing by the user, thereby facilitating the operation of the user.

Figure 7:
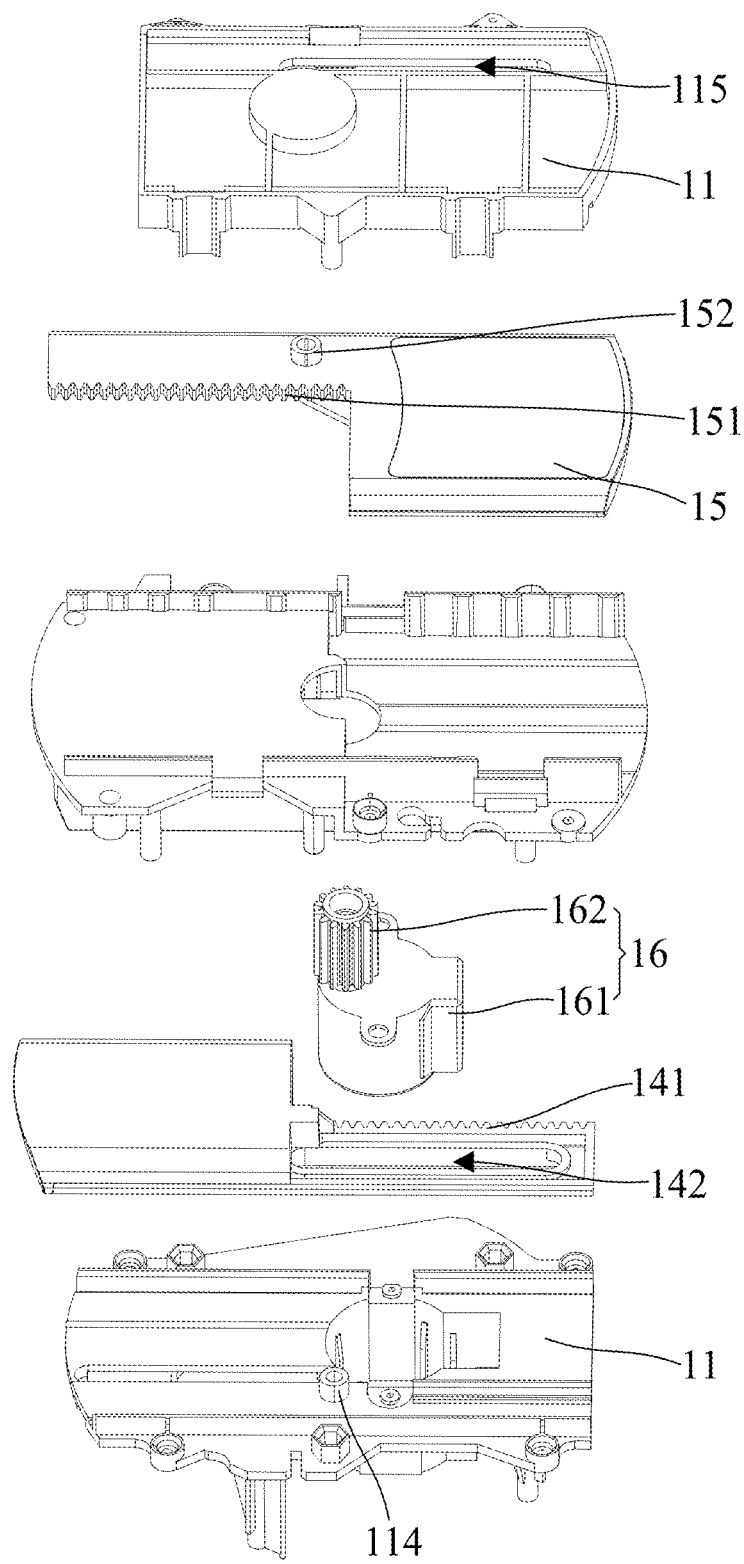
FIG. 7 is a schematic structural diagram of a partial structure of the electric wireless charging device of FIG. 1 in a disassembled state.

Referring to FIG. 6 and FIG. 7 together, in some embodiments, the charging dock 11 is provided with a first limit guiding part 114 and a second limit guiding part 115, the first charging part 14 is provided with a first guiding sliding part 142, the first guiding sliding part 142 is sli dably connected with the first limit guiding part 114, the second charging part 15 is provided with a second guiding sliding part 152, and the second guiding sliding part 152 is slidably connected with the second limit guiding part 115.

In this way, the first limit guiding part 114 and the second limit guiding part 115 may limit movement paths of the first guiding sliding part 142 and the second guiding sliding part 152 respectively, whereby the first charging part 14 and the second charging part 15 may move along a set path, which is helpful to reduce the situation that the first charging part 14 and the second charging part 15 deviate from the set path, further to reduce the situation that the first charging part 14 and the second charging part 15 cannot extend out of the charging dock 11 due to excessively small displacement of the first charging part 14 and the second charging part 15, and further to reduce the situation that the first charging part 14 and the second charging part 15 are detached from the charging dock 11 due to excessively large displacement.

The cooperation between the first guiding sliding part 142 and the first limit guiding part 114 may be cooperation between a block and a groove, for example, the first guiding sliding part 142 may be a guiding groove, the guiding groove is located on a surface of the first charging part 14 facing the charging dock 11, the first limit guiding part 114 may be a guiding block, the guiding block is located on a surface of the charging dock 11 facing the first charging part 14, and the guiding block is slidably located in the guiding groove. In other embodiments, the cooperation between the first guiding sliding part 142 and the first limit guiding part 114 may also be cooperation between blocks. This may be set specifically according to an actual situation.

The cooperation between the second guiding sliding part 152 and the second limit guiding part 115 may be cooperation between a block and a groove, for example, the second guiding sliding part 152 may be a guiding groove, the guiding groove is located on a surface of the second charging part 15 facing the charging dock 11, the second limit guiding part 115 may be a guiding block, the guiding block is located on a surface of the charging dock 11 facing the second charging part 15, and the guiding block is slidably located in the guiding groove. In other embodiments, the cooperation between the second guiding sliding part 152 and the second limit guiding part 115 may also be cooperation between blocks. This may be set specifically according to an actual situation.

Figure 8:
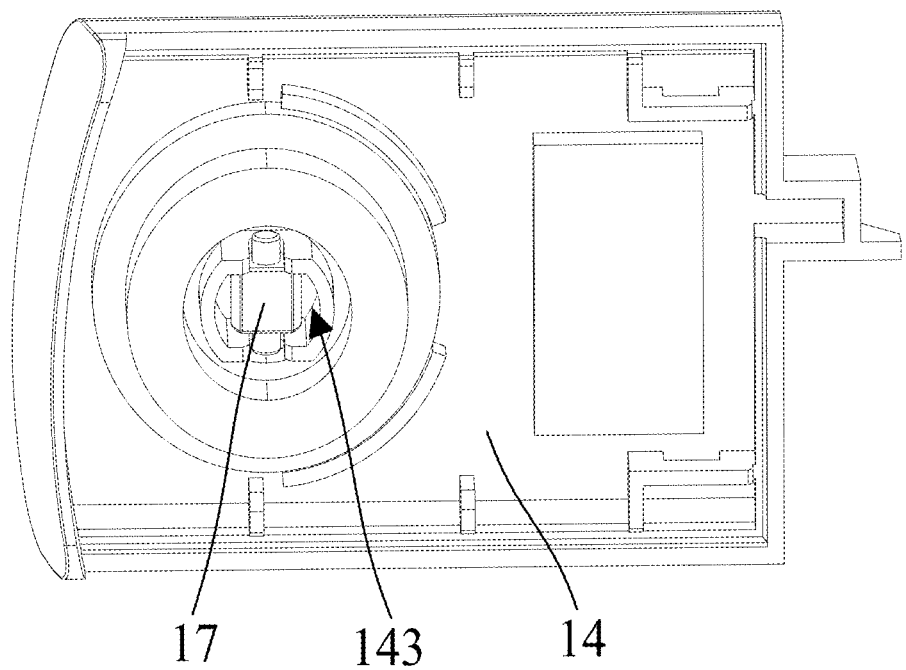
FIG. 8 is a schematic structural diagram of the first charging part of FIG. 6 and a watch magnetic member.

Referring to FIG. 6 and FIG. 8 together, in some embodiments, the electric wireless charging device 100 further includes a watch magnetic member 17, the first charging part 14 is provided with an accommodating cavity 143, and the watch magnetic member 17 is installed in the accommodating cavity 143 in a reversible manner.

Due to variations in the orientation of north and south poles of a magnet inside different types of watches, the watch magnetic member 17 is installed in the accommodating cavity 143 in a reversible manner, whereby the watch magnetic member 17 may be adapted to the corresponding north and south poles of the magnet of different watches, thereby matching the orientations of magnetic poles of magnets in different watches for charging. This design eliminates the need to replace a charging module of the first charging part 14 to adapt to the charging for different watches, which is helpful to improve the adaptability of the first charging part 14, and the charging flexibility of the first charging part 14.

In conclusion, according to the electric wireless charging device 100 provided by the embodiments of the present disclosure, the first driving component 13 of the electric wireless charging device 100 includes the driving body 131 and the driving shaft 132, the driving shaft 132 is connected with the charging dock 11, the driving body 131 is connected with the rotating charging base 12, the driving body 131 is rotatably connected with the driving shaft 132, and the rotation of the driving body 131 relative to the driving shaft 132 is suitable for driving the rotating charging base 12 to rotate. In this way, the electric wireless charging device 100 may charge different electronic devices respectively through the charging dock 11 and the rotating charging base 12, which is helpful to enhance functionalities of the electric wireless charging device 100. Furthermore, the driving body 131 may drive the rotating charging base 12 to rotate, whereby the rotating charging base 12 may automatically rotate to an appropriate position, which is convenient for the user to place the electronic device in an appropriate position for charging, and eliminates the need for the user to manually toggle the rotating charging base 12, thereby facilitating user operation.

Additionally, terms "first" and "second" are only for the purpose of description, and cannot be understood as specific indication or special structure. The description of the term "some embodiments" means specific features, structures, materials, or characteristics described in conjunction with the embodiment or example are contained in at least one embodiment or example of the present disclosure. In the present disclosure, the schematic representations of the above terms are not necessary for the same embodiment or example. Moreover, the described specific features, structures, materials or characteristics may be combined in an appropriate way in any or more embodiments or examples. Furthermore, different embodiments or examples and features of different embodiments or examples described in the present disclosure may be combined by those skilled in the art without contradicting each other.

The above embodiments are only used for illustrating the technical solutions of the present disclosure rather than limiting the present disclosure. Although the present disclosure is described in detail with reference to the foregoing embodiments, it should be understood by those skilled in the art that the technical solutions described in the foregoing embodiments may be modified or some technical features may be equivalently substituted. However, these modifications or substitutions do not make the essence of the corresponding technical solutions depart from the spirit and scope of the technical solutions of various embodiments of the present disclosure, and should fall within the protection scope of the present disclosure.

What is claimed is:

1. An electric wireless charging device, comprising:
   a charging dock and a rotating charging base; and
   a first driving component, the first driving component comprising a driving body and a driving shaft, the driving shaft being connected with the charging dock, the driving body being connected with the rotating charging base, the driving body being rotatably connected with the driving shaft, and the rotation of the driving body relative to the driving shaft being suitable for driving the rotating charging base to rotate;
   a first charging part and a second charging part, the first charging part and the second charging part being both installed on the charging dock, and the first charging part and the second charging part being located at two opposite ends of the charging dock respectively; and
   a second driving component, the second driving component comprising a driving main body and a driving gear, the first charging part being provided with a first toothed part, the second charging part being provided with a second toothed part, the first toothed part being engaged with one end of the driving gear, the second toothed part being engaged with the other end of the driving gear, the driving main body being suitable for driving the driving gear to rotate, the rotation of the driving gear being suitable for driving the first toothed part to move towards a first direction, the rotation of the driving gear being further suitable for driving the second toothed part to move towards a second direction, wherein the first direction and the second direction are different,
   the charging dock comprises a fixed mount, the fixed mount is provided with a fixed part, the driving shaft is installed on the fixed part, the rotating charging base comprises a rotating support, the rotating support is provided with a connecting part, the driving body is installed on the connecting part, and the rotation of the driving body relative to the driving shaft is suitable for driving the rotating support to rotate,
   wherein the charging dock further comprises a limit stop and guiding members, the limit stop is connected with the fixed mount, the limit stop is provided with a limit part, the guiding members penetrate through the limit part and are connected with the rotating support, an end, facing away from the rotating support, of each guiding member is limited in the limit part, the guiding members are suitable for limiting the movement of the rotating support along an axial direction of the guiding members, and the guiding members and the rotating support rotate synchronously around a rotating axis of the driving body.

2. The electric wireless charging device according to claim 1, wherein the fixed mount is further provided with a guiding part, the rotating support is provided with a guiding mating part, and the guiding mating part is slidably connected with the guiding part.

3. The electric wireless charging device according to claim 2, wherein the guiding mating part is provided with a wire through hole, and the wire through hole penetrates through the guiding part.

4. The electric wireless charging device according to claim 1, wherein there are a plurality of guiding members, the plurality of guiding members are disposed around the periphery of the driving body, and the plurality of guiding members are distributed symmetrically relative to the rotating axis of the driving body.

5. The electric wireless charging device according to claim 1, wherein the charging dock is provided with a first limit guiding part and a second limit guiding part, the first charging part is provided with a first guiding sliding part, the first guiding sliding part is slidably connected with the first limit guiding part, the second charging part is provided with a second guiding sliding part, and the second guiding sliding part is slidably connected with the second limit guiding part.

6. The electric wireless charging device according to claim 1, wherein the electric wireless charging device comprises the first charging part and a watch magnetic member, the first charging part is provided with an accommodating cavity, and the watch magnetic member is installed in the accommodating cavity in a reversible manner.

* * * * *